(12) United States Patent
Nakatani

(10) Patent No.: US 9,017,578 B2
(45) Date of Patent: Apr. 28, 2015

(54) METHOD FOR PRODUCING A METAL NANOPARTICLE COLLOID

(75) Inventor: Isao Nakatani, Ibaraki (JP)

(73) Assignee: National Institute For Materials Science, Ibaraki (JP)

(*) Notice: Subject to any disclaimer, the term of this patent is extended or adjusted under 35 U.S.C. 154(b) by 294 days.

(21) Appl. No.: 13/700,793

(22) PCT Filed: May 31, 2011

(86) PCT No.: PCT/JP2011/062504
§ 371 (c)(1),
(2), (4) Date: Jan. 29, 2013

(87) PCT Pub. No.: WO2011/152406
PCT Pub. Date: Dec. 8, 2011

(65) Prior Publication Data
US 2013/0126798 A1 May 23, 2013

(30) Foreign Application Priority Data
May 31, 2010 (JP) ................................. 2010-124163

(51) Int. Cl.
*H01B 1/22* (2006.01)
*B01F 17/00* (2006.01)
(Continued)

(52) U.S. Cl.
CPC ......... *B01F 17/0042* (2013.01); *B01J 13/0043* (2013.01); *B22F 1/02* (2013.01); *B22F 1/0022* (2013.01); *B82Y 30/00* (2013.01)

(58) Field of Classification Search
None
See application file for complete search history.

(56) References Cited

U.S. PATENT DOCUMENTS 4,599,184 A 7/1986 Nakatani et al.
6,730,400 B1* 5/2004 Komatsu et al. ............ 428/403
(Continued)

FOREIGN PATENT DOCUMENTS

JP 2008-150630 7/2008

OTHER PUBLICATIONS

International Search Report mailed Aug. 30, 2011 in corresponding International (PCT) Application No. PCT/JP2011/062504.
(Continued)

*Primary Examiner* — Harold Pyon
*Assistant Examiner* — Katie L Hammer
(74) *Attorney, Agent, or Firm* — Wenderoth, Lind & Ponack, L.L.P.

(57) ABSTRACT

The problems can be solved by using a method for producing a metal nanoparticle colloid, which comprises the steps of S1: mixing, into a nonpolar hydrocarbon oil having a vapor pressure of $10^{-3}$ Torr or less at room temperature, organic molecules having both a hydrophilic group and a lipophilic group and having in the end of the hydrophilic group an N, S, P, or O atom or having at the hydrophilic group a functional group of an $NH_2$ group, an NH group, an SH group, a PO group, or an OH group to prepare a base liquid, and S2: placing the base liquid in a rotatable vacuum drum and charging a non-magnetic metal material in a crucible provided in the vacuum drum, and depositing the vapor of the non-magnetic metal material on the base liquid which adheres to the inner wall of the vacuum drum and rotates together with the rotating drum under conditions such that the inside of the vacuum drum is under a reduced pressure and the vacuum drum is rotated, and a task of the present invention is to provide a method for producing a metal nanoparticle colloid having non-magnetic metal nanoparticles having various shapes.

17 Claims, 4 Drawing Sheets

(51) Int. Cl.
*B01J 13/00* (2006.01)
*B22F 1/02* (2006.01)
*B22F 1/00* (2006.01)
*B82Y 30/00* (2011.01)

(56) References Cited

U.S. PATENT DOCUMENTS

2001/0004477 A1* 6/2001 Fukunaga et al. ............ 427/475
2006/0266156 A1* 11/2006 Hirakoso et al. ................ 75/252
2007/0140951 A1* 6/2007 O'Brien et al. ............. 423/592.1
2009/0029148 A1* 1/2009 Hashimoto et al. ........... 428/323

OTHER PUBLICATIONS

I. Nakatani et al., "Preparation and Magnetic Properties of Colloidal Ferromagnetic Metals", Journal of Magnetism and Magnetic Materials, vol. 65, pp. 261-264, 1987.

* cited by examiner (a)

(b)

(c)

METHOD FOR PRODUCING A METAL NANOPARTICLE COLLOID

TECHNICAL FIELD

The present invention relates to a method for producing a metal nanoparticle colloid.

BACKGROUND ART

A metal nanoparticle colloid is a colloid having metal nanoparticles dispersed therein. Metal nanoparticles in a bare state hardly keep themselves stable physically and chemically, and they have remarkable chemical reactivity. Therefore, the metal nanoparticles are handled in the form of a colloid which is formed by covering the surfaces of the metal nanoparticles with a ligand, such as a surfactant, to stabilize them, and then dissolving the resultant nanoparticles in a solvent, such as an oil.

Conventionally, in the production technique of metal nanoparticles for use in a metal nanoparticle colloid, there have been made vigorous studies with a view toward developing metal nanoparticles having a smaller and uniform size, but, in recent years, the development of a technique for controlling the fine particles in their shape to form a metal nanoparticle colloid having metal nanoparticles of an anisotropic shape is desired.

The reason for this is, for example, that the metal nanoparticles of an anisotropic shape can be increased in the surface area, and hence can be improved in the effect of a catalytic reaction on their surfaces. However, the size of the metal nanoparticles is too small to form a metal nanoparticle colloid having metal nanoparticles of an anisotropic shape.

Patent documents 1 and 2 (shown below) disclose a method for producing a metal nanoparticle colloid rationally with high efficiency by an active liquid surface continuous vacuum deposition method. The active liquid surface continuous vacuum deposition method is a method in which a metal or alloy in a bulk form is heated and evaporated in a vacuum and the resultant metal atoms are allowed to adsorb on the surface of a liquid solvent, such as an oil, having the surface covered with surfactant molecules so that fine particles of the metal are generated on the surface of the liquid medium, and the resultant medium is collected.

In this method, a layer of the surfactant molecules has a role in effectively capturing the flying metal atoms, and further has a role in covering the surfaces of the metal nanoparticles immediately after generated by condensation of the metal atoms to make the metal nanoparticles miscible with a solvent, such as an oil, and dissolve them in the solvent. Furthermore, the surfactant covering layer has a role of barrier in preventing the unstable metal nanoparticles from colliding with one another and fusing together and growing into larger particles or metal bulk.

By conducting this process in a vacuum container provided in a rotating drum in a continuous manner, a colloid system having nanoparticles having a uniform size dispersed in an oil solvent at a high concentration is formed. In this method, a metal or alloy fine particle colloid having the smallest and uniform size can be easily obtained using a simple apparatus, and further the method can be applied to various types of metals and alloys.

In the active liquid surface continuous vacuum deposition method, a ferromagnetic metal nanoparticle colloid used in a magnetic fluid or the like is easy to produce; however, a non-magnetic metal nanoparticle colloid is difficult to form. In addition, even in this method, a metal nanoparticle colloid having metal nanoparticles of an anisotropic shape is difficult to obtain.

RELATED ART REFERENCES

Patent Documents

Patent document 1: JP-A-60-162704
Patent document 2: JP-A-60-161490

SUMMARY OF THE INVENTION

Problems that the Invention is to Solve

A task of the present invention is to provide a method for producing a metal nanoparticle colloid having non-magnetic metal nanoparticles having various shapes.

Means for Solving the Problems

The method for producing a metal nanoparticle colloid of the invention is a method for producing a metal nanoparticle colloid having metal nanoparticles dispersed in a nonpolar hydrocarbon oil, metal nanoparticles being coated with organic molecules, wherein the method comprises the steps of: mixing, into a nonpolar hydrocarbon oil having a vapor pressure of $10^{-3}$ Torr or less at room temperature, organic molecules having both a hydrophilic group and a lipophilic group and having in the end of the hydrophilic group an atom of an N atom, an S atom, a P atom, or an O atom or having at the end of the hydrophilic group a functional group of an $NH_2$ group, an NH group, an SH group, a PO group, or an OH group to prepare a base liquid; and placing the base liquid in a rotatable vacuum drum and charging a non-magnetic metal material in a crucible provided in the vacuum drum, and depositing the vapor of the non-magnetic metal material on the base liquid which adheres to the inner wall of the vacuum drum and rotates together with the rotating drum under conditions such that the inside of the vacuum drum is under a reduced pressure and the vacuum drum is rotated.

In the method for producing a metal nanoparticle colloid of the invention, the nonpolar hydrocarbon oil is an alkylnaphthalene, a paraffin, or a naphthene. In the method for producing a metal nanoparticle colloid of the invention, the non-magnetic metal material is Cu, Ag, Au, Sn, Bi, Cr, Dy, In, Mn, Nd, Pd, or Zn.

In the method for producing a metal nanoparticle colloid of the invention, the organic molecules are an aliphatic amine, a sorbitan fatty acid ester, a polyglycerol fatty acid ester, a mercaptan, a phosphate, an aliphatic phosphoric oxide, an alkylamine fatty acid salt, a polypropylene oxide fatty acid ether, a thiol, or a succinic acid derivative. Examples of the succinic acid derivatives include succinic acid polyethyleneamine polypropylene oxide fatty acid ether, polybutenylsuccinic acid polyamine imide, and polybutenylsuccinic acid ester.

In the method for producing a metal nanoparticle colloid of the invention, the concentration of the organic molecules in the base liquid is 3 to 20% by volume.

In the method for producing a metal nanoparticle colloid of the invention, the base running speed in the vacuum drum is 10 to 500 mm/s.

The metal nanoparticle colloid of the invention is a metal nanoparticle colloid produced by the above-mentioned method for producing a metal nanoparticle colloid, wherein the metal nanoparticle colloid has a nonpolar hydrocarbon oil having a vapor pressure of $10^{-3}$ Torr or less at room temperature, metal nanoparticles being dispersed in the nonpolar hydrocarbon oil, comprising a non-magnetic metal, and having a substantially spherical shape (shape of substantially sphere), a substantially plate shape (flattened flake shape), a substantially column shape (rod-like shape), a substantially fibrous shape, a shape of non-sphere (indefinite shape), a shape of sphere, a shape of polygonal octahedron, or a shape of hexagonal prism, and organic molecules joined to the metal nanoparticles through an atom of an N atom, an S atom, a P atom, an O atom in an ester linkage, an O atom in an ether linkage, or an O atom in an epoxy linkage, or a functional group of an $NH_2$ group, an NH group, an SH group, a PO group, or an OH group.

Advantage of the Invention

The method for producing a metal nanoparticle colloid of the invention is a method for producing a metal nanoparticle colloid having metal nanoparticles dispersed in a nonpolar hydrocarbon oil, metal nanoparticles being coated with organic molecules, wherein the method comprises the steps of: mixing, into a nonpolar hydrocarbon oil having a vapor pressure of $10^{-3}$ Torr or less at room temperature, organic molecules having both a hydrophilic group and a lipophilic group and having in the end of the hydrophilic group an atom of an N atom, an S atom, a P atom, or an O atom or having at the end of the hydrophilic group a functional group of an $NH_2$ group, an NH group, an SH group, a PO group, or an OH group to prepare a base liquid; and placing the base liquid in a rotatable vacuum drum and charging a non-magnetic metal material in a crucible provided in the vacuum drum, and depositing the vapor of the non-magnetic metal material on the base liquid which adheres to the inner wall of the vacuum drum and rotates together with the rotating drum under conditions such that the inside of the vacuum drum is under a reduced pressure and the vacuum drum is rotated, and therefore there can be produced a metal nanoparticle colloid which is advantageous not only in that the colloid has non-magnetic metal nanoparticles formed from a non-magnetic metal, but also in that the colloid has metal nanoparticles having various shapes formed by using an appropriate combination of a non-magnetic metal material and organic molecules.

The metal nanoparticle colloid of the invention is a metal nanoparticle colloid produced by the above-mentioned method for producing a metal nanoparticle colloid, wherein the metal nanoparticle colloid has a nonpolar hydrocarbon oil having a vapor pressure of $10^{-3}$ Torr or less at room temperature, metal nanoparticles being dispersed in the nonpolar hydrocarbon oil, comprising a non-magnetic metal, and having a substantially spherical shape (shape of substantially sphere), a substantially plate shape (flattened flake shape), a substantially column shape (rod-like shape), a substantially fibrous shape, a shape of non-sphere (indefinite shape), a shape of sphere, a shape of polygonal octahedron, or a shape of hexagonal prism, and organic molecules joined to the metal nanoparticles through an atom of an N atom, an S atom, a P atom, an O atom in an ester linkage, an O atom in an ether linkage, or an O atom in an epoxy linkage, or a functional group of an $NH_2$ group, an NH group, an SH group, a PO group, or an OH group, and therefore the metal nanoparticle colloid is advantageous not only in that it has non-magnetic metal nanoparticles formed from a non-magnetic metal, but also in that the colloid has metal nanoparticles having a substantially spherical shape (shape of substantially sphere), a substantially plate shape (flattened flake shape), a substantially column shape (rod-like shape), a substantially fibrous shape, a shape of non-sphere (indefinite shape), a shape of sphere, a shape of polygonal octahedron, or a shape of hexagonal prism.

BRIEF DESCRIPTION OF DRAWINGS

FIG. 5 is views showing an example of the metal nanoparticle colloid according to an embodiment of the invention, wherein FIG. 5(a) is a diagrammatic cross-sectional view, FIG. 5(b) is an enlarged view of the portion B of FIG. 5(a), and FIG. 5(c) is an enlarged view of the portion C of FIG. 5(b).

MODE FOR CARRYING OUT THE INVENTION

Embodiment of the Present Invention

Hereinbelow, the method for producing a metal nanoparticle colloid and the metal nanoparticle colloid according to an embodiment of the invention will be described with reference to the accompanying drawings.

Figure 1:
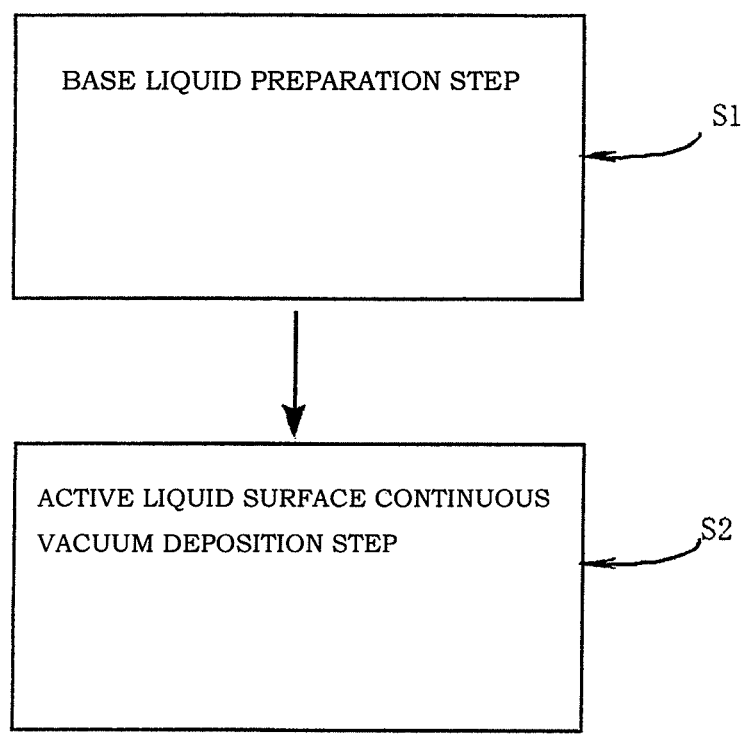
FIG. 1 is a flowchart showing an example of the method for producing a metal nanoparticle colloid according to an embodiment of the invention.

The method for producing a metal nanoparticle colloid according to an embodiment of the invention is first described. FIG. 1 is a flowchart showing an example of the method for producing a metal nanoparticle colloid according to the embodiment of the invention.

As shown in FIG. 1, the method for producing a metal nanoparticle colloid according to the embodiment of the invention comprises a base liquid preparation step S1 and an active liquid surface continuous vacuum deposition step S2.

Figure 2:
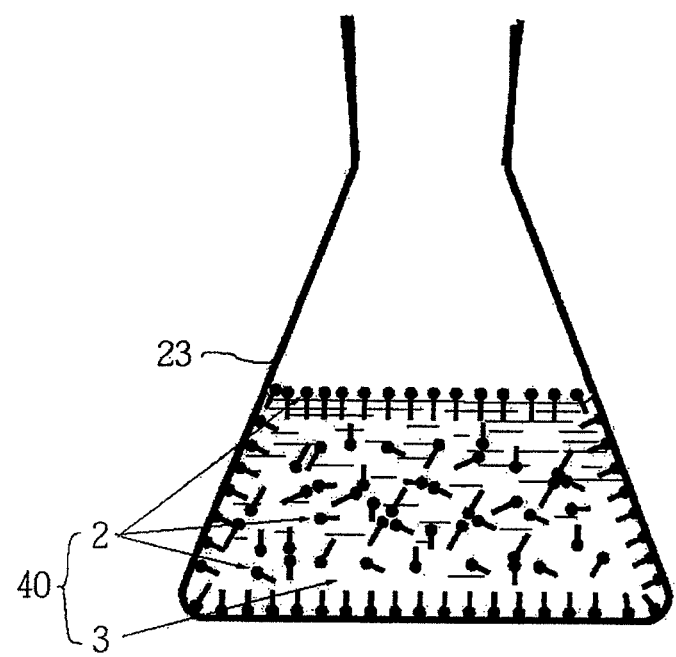
FIG. 2 is a diagrammatic cross-sectional view showing an example of the base liquid.

The base liquid preparation step S1 is a step for preparing a base liquid used in an active liquid surface continuous vacuum deposition step in order to produce a metal nanoparticle colloid. As shown in FIG. 2, into a nonpolar hydrocarbon oil 3 placed in a container 23 are mixed organic molecules 2 having both a hydrophilic group and a lipophilic group and having in the end of the hydrophilic group an atom of an N atom, an S atom, a P atom, or an O atom or having at the end of the hydrophilic group a functional group of an $NH_2$ group, an NH group, an SH group, a PO group, or an OH group so that a predetermined concentration is achieved to prepare a base liquid 40. In FIG. 2, the organic molecules 2 are diagrammatically shown by indicating the hydrophilic group side by a circular form and indicating the lipophilic group side by a rod-like form.

With respect to the nonpolar hydrocarbon oil 3, it is preferred to use an oil having a vapor pressure of $10^{-3}$ Torr or less at room temperature. In this case, even when the vacuum drum is rotated, it is possible to allow the nonpolar hydrocarbon oil in a predetermined thickness to adhere to the inner wall of the vacuum drum, and thus a metal material can be deposited on the nonpolar hydrocarbon oil, and further, when the organic molecules used as a surfactant having a hydrophile-lipophile balance value (HLB value) of 9 or less are mixed into the nonpolar hydrocarbon oil, the organic molecules are uniformly dissolved in the nonpolar hydrocarbon oil without forming a micelle, and therefore the resultant mixture can be used as an appropriate base liquid for the active liquid surface continuous vacuum deposition method. It is preferred that the nonpolar hydrocarbon oil 3 is an alkylnaphthalene, a paraffin, or a naphthene.

It is preferred that the alkyl group of the alkylnaphthalene has 12 to 24 carbon atoms. When the alkyl group of the alkylnaphthalene has carbon atoms in this range, the molecular weight can be in an appropriate range and the stability of the colloid can be in an appropriate range. When the alkyl group has less than 12 carbon atoms, the vapor pressure disadvantageously becomes high, and, when the alkyl group has more than 24 carbon atoms, the solution disadvantageously becomes viscous and loses fluidity.

It is preferred that the organic molecules 2 are an aliphatic amine, a sorbitan fatty acid ester, a polyglycerol fatty acid ester, a mercaptan, a phosphate, an aliphatic phosphoric oxide, an alkylamine fatty acid salt, a polypropylene oxide fatty acid ether, a thiol, or a succinic acid derivative. Examples of the succinic acid derivatives include succinic acid polyethyleneamine polypropylene oxide fatty acid ether, polybutenylsuccinic acid polyamine imide, and polybutenylsuccinic acid ester.

Examples of the aliphatic amines include primary amines, such as oleic amide (commonly called oleylamine), stearic amide (commonly called stearylamine), palmitylamine, myristylamine, and laurylamine; secondary amines, such as distearylamine and dioleylamine; and tertiary amines, such as trioctylamine and dimethylpalmitylamine. Further examples include diamines of all the above-mentioned amines having amino groups at both ends, and polyamines which are polymers of all the above-mentioned amines. Preferred are aliphatic amines having an HLB value of 9 or less because they are uniformly dissolved in the nonpolar hydrocarbon oil 3 without forming a micelle.

Examples of the sorbitan fatty acid esters include sorbitan monostearate, sorbitan monooleate, sorbitan tristearate, sorbitan trioleate, sorbitan trilaurate, and sorbitan tripalmitate, and preferred are those having an HLB value of 9 or less.

With respect to the polyglycerol fatty acid ester, preferred is a fatty acid ester of a dehydration condensation polymer of glycerol, which has an HLB value of 5 or less. Examples of such esters include tetraglycerol pentaoleate and hexaglycerol pentaoleate.

Examples of the thiols (mercaptans) include stearyl mercaptan, oleyl mercaptan, palmityl mercaptan, myristyl mercaptan, and lauryl mercaptan, and a thiol has a higher vapor pressure than that of the corresponding alcohol, and therefore preferred are thiols (mercaptans) having a larger molecular weight.

Examples of the succinic acid derivatives include dodecenylsuccinic acid, alkenylsuccinic acid, and polybutenylsuccinic acid. Preferred are those having an HLB value of 9 or less. A wide variety of lipophilic groups can be used. The amine (imide) derivative of succinic acid is described below after the description of amines.

The phosphate is selected from trioleyl phosphate, tristearyl phosphate, tripalmityl phosphate, trimyristyl phosphate, trilauryl phosphate, and trioctyl phosphate.

The aliphatic phosphoric oxide is selected from trimyristylphosphine oxide, trilaurylphosphine oxide, trioctylphosphine oxide, and those substituted with different lipophilic groups.

The alkylamine fatty acid salt is selected from all the fatty acid salts of the above-mentioned aliphatic amines. Examples include trioctylamine oleate and trioctylamine stearate of a tertiary amine and dioleylamine oleate of a secondary amine, and various types of substances can be used.

As an example of an amine (imide) derivative of succinic acid, there can be mentioned a succinic acid polyethyleneamine, which is selected from monoethylenediamine succinimide, diethylenetriamine succinimide, triethylenetetramine succinimide, tetraethylenepentamine succinimide, pentaethylenehexamine succinimide, and mixtures thereof. The polyethyleneamines of the above-mentioned succinic acid derivatives are also included.

Examples of the polypropylene oxide fatty acid ethers include propylene oxide oleyl ether, ethylene oxide stearyl ether, polypropylene oxide oleyl ether, and polypropylene ethylene oxide stearyl ether, and the degree of polymerization of propylene oxide is preferably in the range of from 2 to 7. The polypropylene oxide fatty acid ether, which has ethylene oxide instead of propylene oxide, or which is a copolymer formed from propylene oxide and ethylene oxide, can be used as long as it has an HLB of 9 or less.

Instead of the ether, a corresponding polypropylene oxide fatty acid ester can be used as long as it has an HLB of 9 or less.

It is preferred that the concentration of the organic molecules 2 in the base liquid 40 is 3 to 20% by volume. In this case, the number of the organic molecules surrounding the non-magnetic metal material during the vapor deposition can be appropriate, making it possible to produce a metal nanoparticle colloid advantageous not only in that it has non-magnetic metal nanoparticles formed from a non-magnetic metal, but also in that it has metal nanoparticles having various shapes.

Figure 3:
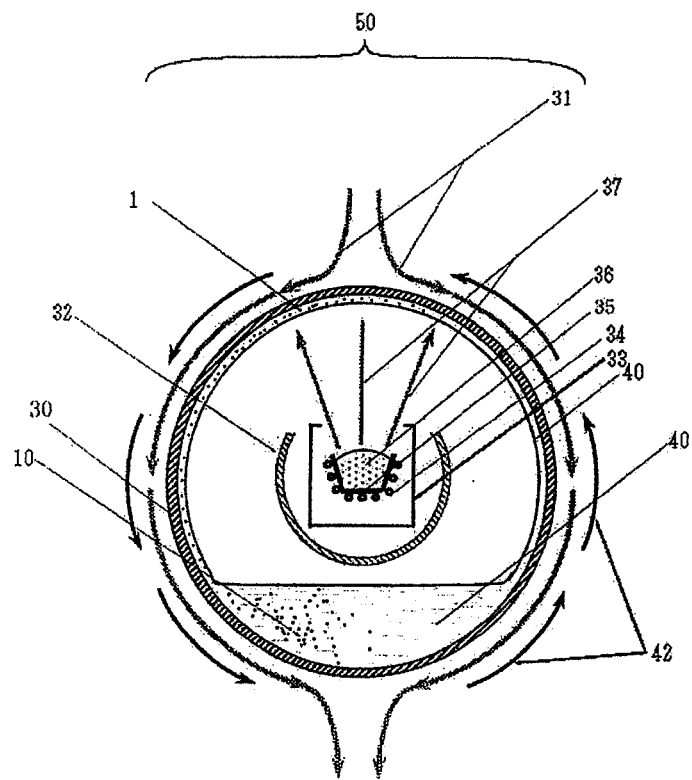
FIG. 3 is a diagrammatic view showing an example of the apparatus for producing a metal nanoparticle colloid.

The active liquid surface continuous vacuum deposition step S2 is a step for continuously vacuum-depositing a metal material on the active surface of the base liquid using an active liquid surface continuous vacuum deposition apparatus. FIG. 3 is a diagrammatic view showing an example of an active liquid surface continuous vacuum deposition apparatus. As diagrammatically shown in FIG. 3, an active liquid surface continuous vacuum deposition apparatus 50 has a vacuum drum 30 having a circular cross-section and being capable of rotating in a direction 42 which is a circumferential direction of the cross-section.

In part of the wall surface of the vacuum drum 30 is formed a hole portion (not shown) for communication between the inside and outside of the vacuum drum, and a door portion (not shown) capable of being opened and closed is provided, so that a material or the like can be brought into the vacuum drum 30.

A crucible 35 is disposed in the center portion of the inside of the vacuum drum 35. The crucible 35 has an opening on the side opposite to the inner bottom of the vacuum drum 35. Further, the crucible 35 on the inner bottom side is surrounded by a heater wiring 34. The crucible 35 can be heated by heating the heater wiring 34.

With respect to the crucible 35, any crucible may be used as long as it can be heated to a high temperature enough to evaporate a metal material. The heater wiring 34 is, for example, a tungsten resistance wire.

The crucible 35 is disposed on a support 33. The support 33 has an opening on the side opposite to the inner bottom of the vacuum drum 35. A masking shield 32 is provided so as to surround the inner bottom and sides of the support 33. The apparatus has a construction such that even when the crucible 35 is heated, the masking shield 32 shields radiant heat radiated from the evaporation source so that the heat is not transferred to the inner wall side of the vacuum drum 30.

As shown in FIG. 3, the apparatus has a construction such that cooling water flows outside of the vacuum drum 35 in the direction indicated by arrows 31, making it possible to cool the vacuum drum 35. By virtue of this, the temperature of the base liquid 40 adhering to the inner wall of the vacuum drum 35 is maintained at room temperature.

The apparatus has a construction such that a not shown thermocouple is provided near the inner wall, making it possible to monitor the temperature of the base liquid 40.

The door portion of the vacuum drum 30 is first opened, and a predetermined amount of the base liquid 40 is charged in the inner bottom of the vacuum drum 30. Then, a predetermined amount of a metal material 36 is placed in the crucible 35 provided in the central portion of the inside of the vacuum drum 30.

It is preferred that the metal material 36 is a non-magnetic metal. In this case, non-magnetic metal nanoparticles can be formed.

It is preferred that the non-magnetic metal is Cu, Ag, Au, or Sn. In this case, metal nanoparticles having various shapes can be formed. Alternatively, In, Bi, Pd, Cr, Dy, Mn, Nd, or Zn may be used.

Then, the door portion of the vacuum drum 30 is closed, and the inside of the vacuum drum 30 is evacuated by means of a vacuum pump connected through another hole portion formed in the wall surface. The degree of vacuum is preferably $10^{-3}$ Torr or more. In this case, impurities can be reduced, and further efficient deposition can be made.

Then, the vacuum drum 30 is rotated at a predetermined speed. It is preferred that the base running speed in the vacuum drum 35 is 10 to 500 mm/s. In this case, metal nanoparticles having desired various shapes and sizes can be formed.

As the vacuum drum 30 is rotated, the base liquid 40 in a thin film form adheres to the inner wall of the vacuum drum 30 and develops to the upper portion of the inner wall, so that the inner wall of the vacuum drum 30 is in the state of being uniformly wetted with the base liquid 40.

Then, the heater wiring 34 is heated to heat the crucible 35 to a predetermined temperature. Thus, the metal material 36 in the crucible 35 is heated, so that the metal material 36 is evaporated. As shown in FIG. 3, the metal material 36 is evaporated in the direction indicated by arrows 37 through the opening formed in the crucible 35. The heating temperature for the crucible 35 is appropriately selected according to the type of the metal material used.

As the vacuum drum 30 is rotated, the base liquid 40 adhering to the inner wall of the vacuum drum 35 moves to the upper portion of the inside of the vacuum drum 30. Therefore, the metal material 36 is continuously deposited on the surface of the base liquid 40.

The organic molecules function as a surfactant, and the organic molecules 2 are arranged on the surface of the base liquid 40 so that the lipophilic group side of the molecule is disposed inside of the nonpolar hydrocarbon oil 3 and an atom of an N atom, an S atom, a P atom, or an O atom in the end of the hydrophilic group having a property of repelling an oil, or a functional group of an $NH_2$ group, an NH group, an SH group, a PO group, or an OH group at the end of the hydrophilic group protrudes from the surface of the liquid. Consequently, the surface of the base liquid 40 is modified into a surface having high adhesion properties. For this reason, this surface of the liquid is called an active liquid surface.

Figure 4:
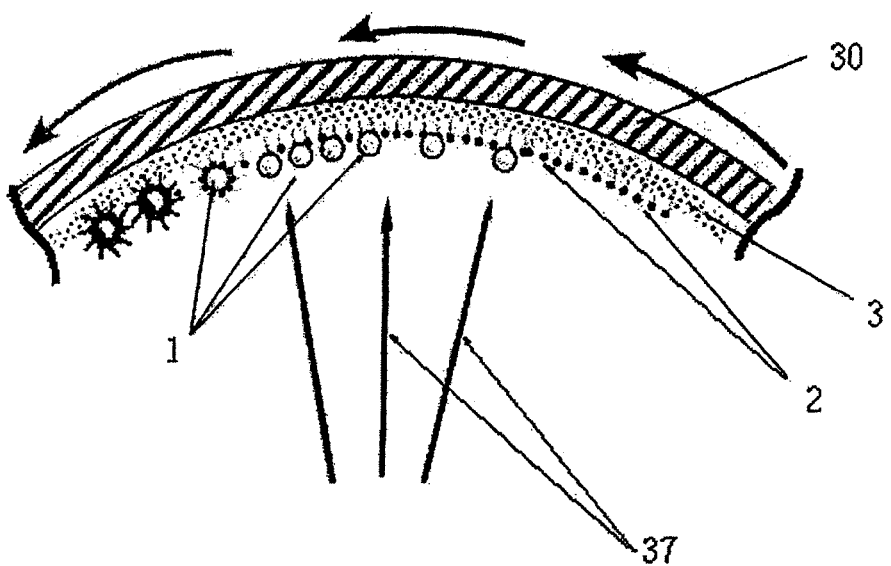
FIG. 4 is a view diagrammatically showing the formation of a metal nanoparticle colloid as viewed from a microscopic viewpoint.

Therefore, as shown in FIG. 4, after the metal material 36 has reached the surface of the base liquid 40, the metal material 36 is efficiently deposited on the base liquid 40, and quickly surrounded by the organic molecules 2 in a predetermined size and shape, forming metal nanoparticles 1 having a predetermined size and shape.

With respect to the size and shape of the metal nanoparticles 1, desired size and shape can be achieved by appropriately selecting the metal material and organic molecules.

The metal nanoparticles 1 surrounded by the organic molecules 2 are in a state such that they are miscible with an oil, and therefore easily incorporated into the inside of the nonpolar hydrocarbon oil 3 to form a metal nanoparticle colloid 10. Then, as the vacuum drum 35 is rotated, the metal nanoparticle colloid 10 moves to the inner bottom side of the vacuum drum. The base liquid 40 on which the metal material is deposited is continuously supplied to the upper portion of the inside of the rotating drum by the rotation of the vacuum drum 35, and therefore the metal nanoparticle colloid 10 is continuously formed.

By conducting the vapor deposition step in a continuous manner, the concentration of the metal nanoparticles 1 can be gradually increased, making it possible to form a stable metal nanoparticle colloid 10 with high concentration. The vapor deposition step is completed, and the inside of the vacuum drum 35 is allowed to be under atmospheric pressure, and then the door portion is opened and the formed metal nanoparticle colloid 10 is removed from the drum.

Figure 5:
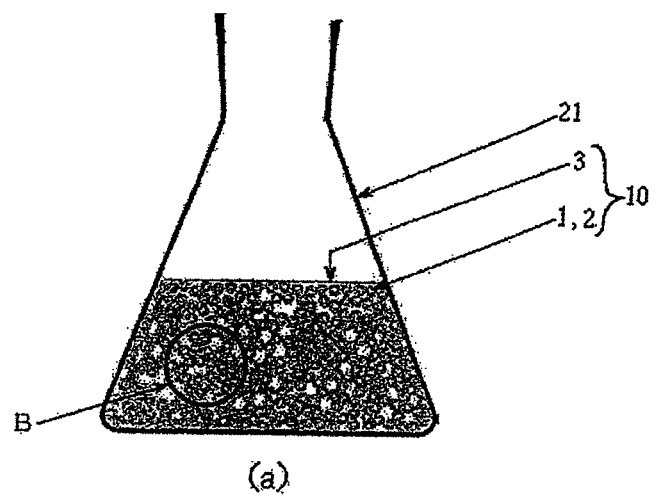
Figure 5:
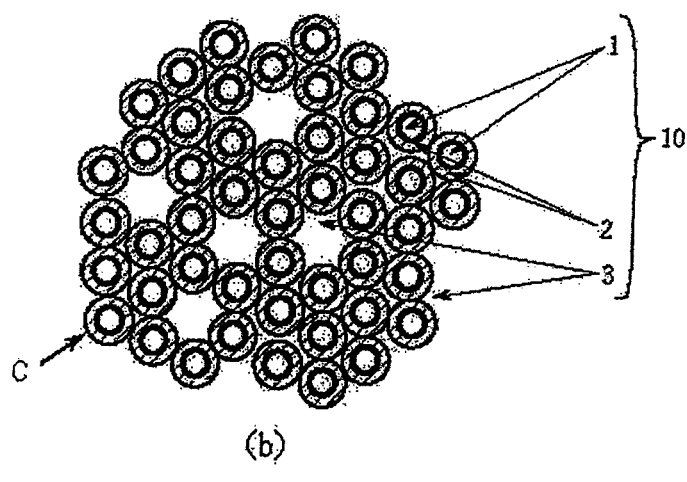
Figure 5:
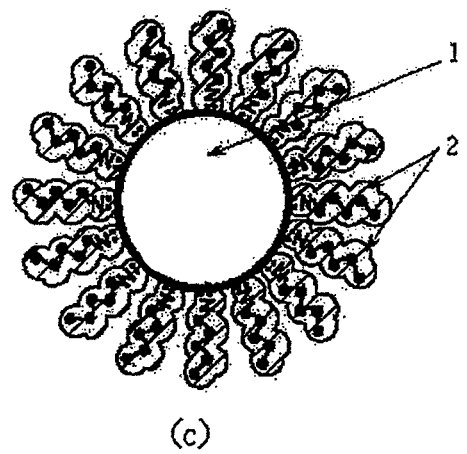

FIG. 5 is views showing an example of the metal nanoparticle colloid according to an embodiment of the invention, wherein FIG. 5($a$) is a diagrammatic cross-sectional view, FIG. 5($b$) is an enlarged view of the portion B of FIG. 5($a$), and FIG. 5($c$) is an enlarged view of the portion C of FIG. 5($b$). As shown in FIG. 5, the metal nanoparticle colloid 10 is placed in a container 21. The metal nanoparticle colloid 10 according to the embodiment of the invention comprises a nonpolar hydrocarbon oil 3, and metal nanoparticles 1 being coated with organic molecules 2 and dispersed in the nonpolar hydrocarbon oil 3.

As shown in FIG. 5($c$), the organic molecules 2 are joined to the metal nanoparticles 1 through a functional group of an $NH_2$ group. However, the joint is not limited to this, and the organic molecules 2 may be joined to the metal nanoparticles 1 through an atom of an N atom, an S atom, a P atom, an O atom in an ester linkage, an O atom in an ether linkage, or an O atom in an epoxy linkage, or a functional group of an $NH_2$ group, an NH group, an SH group, a PO group, or an OH group. In this case, the bonding of the organic molecules to the metal nanoparticles can be strong.

The organic molecules 2 are an aliphatic amine, a sorbitan fatty acid ester, a polyglycerol fatty acid ester, a mercaptan, a succinic acid derivative, a phosphate, an aliphatic phosphoric oxide, an alkylamine fatty acid salt, a succinic acid polyethyleneamine, a polypropylene oxide fatty acid ether, or the like.

The metal nanoparticles 1 are a non-magnetic metal, specifically, Cu, Ag, Au, Sn, Bi, Cr, Dy, In, Mn, Nd, Pd, or Zn. By using these materials, a colloid having non-magnetic metal nanoparticles can be formed. The nonpolar hydrocarbon oil 3 is an oil having a vapor pressure of $10^{-3}$ Torr or less at room temperature, and is an alkylnaphthalene, a paraffin, or a naphthene.

As shown in FIG. 5, the metal nanoparticles 1 have a substantially spherical shape. However, the shape of the metal nanoparticles 1 is not limited to this, and examples of shapes of the metal nanoparticles 1 include a substantially spherical shape (shape of substantially sphere), a substantially plate shape (flattened flake shape), a substantially column shape (rod-like shape), a substantially fibrous shape, a shape of non-sphere (indefinite shape), a shape of sphere, a shape of polygonal octahedron, and a shape of hexagonal prism. The metal nanoparticle colloid having metal nanoparticles having the above-mentioned shape can exhibit excellent catalytic properties.

The diameter d of the metal nanoparticles 1 can be about 2 to 300 nm.

When the metal nanoparticles 1 have a substantially column shape or fibrous shape, the length of the nanoparticles can be about 1 μm. The shape of such nanoparticles is characterized by an aspect ratio A (long axis/short axis). The shape can be roughly classified into a substantially spherical shape in the case where A=1, a substantially column shape or substantially plate shape in the case where A>1 and there is no bending point, and a substantially fibrous shape in other cases.

The method for producing a metal nanoparticle colloid according to the embodiment of the invention is a method for producing a metal nanoparticle colloid 10 having metal particles 1 dispersed in a nonpolar hydrocarbon oil 3, the metal nanoparticles 1 being coated with organic molecules 2, wherein the method comprises the steps of S1: mixing, into a nonpolar hydrocarbon oil 3 having a vapor pressure of $10^{-3}$ Torr or less at room temperature, organic molecules 2 having both a hydrophilic group and a lipophilic group and having in the end of the hydrophilic group an atom of an N atom, an S atom, a P atom, or an O atom or having at the end of the hydrophilic group a functional group of an $NH_2$ group, an NH group, an SH group, a PO group, or an OH group to prepare a base liquid 40, and S2: placing the base liquid 40 in a rotatable vacuum drum 30 and charging a non-magnetic metal material 36 in a crucible 35 provided in the vacuum drum 30, and depositing the vapor of the non-magnetic metal material 36 on the base liquid 40 which adheres to the inner wall of the vacuum drum 30 and rotates together with the rotating drum 30 under conditions such that the inside of the vacuum drum 30 is under a reduced pressure and the vacuum drum 30 is rotated, and therefore there can be produced a metal nanoparticle colloid 10 which is advantageous not only in that the colloid has non-magnetic metal nanoparticles 1 formed from a non-magnetic metal 36, but also in that the colloid has metal nanoparticles 1 having various shapes.

In the method for producing a metal nanoparticle colloid according to the embodiment of the invention, the nonpolar hydrocarbon oil 3 is an alkylnaphthalene, a paraffin, or a naphthene, and therefore a base liquid 40 suitable for the vapor deposition of the non-magnetic metal material 36 by an active liquid surface continuous vacuum deposition method can be formed, and thus not only can non-magnetic metal nanoparticles 1 be easily formed from a non-magnetic metal, but also a metal nanoparticle colloid having metal nanoparticles having various shapes can be produced.

In the method for producing a metal nanoparticle colloid according to the embodiment of the invention, the non-magnetic metal material 36 is Cu, Ag, Au, Sn, Bi, Cr, Dy, In, Mn, Nd, Pd, or Zn, and therefore there can be produced a metal nanoparticle colloid which is advantageous not only in that the colloid has non-magnetic metal nanoparticles formed from a non-magnetic metal, but also in that the colloid has metal nanoparticles having various shapes.

In the method for producing a metal nanoparticle colloid according to the embodiment of the invention, as the organic molecules 2, an aliphatic amine, a sorbitan fatty acid ester, a polyglycerol fatty acid ester, a mercaptan, a phosphate, an aliphatic phosphoric oxide, an alkylamine fatty acid salt, a thiol, a polypropylene oxide fatty acid ether, or a succinic acid derivative is used. Examples of the succinic acid derivatives include succinic acid polyethyleneamine polypropylene oxide fatty acid ether, polybutenylsuccinic acid polyamine imide, and polybutenylsuccinic acid ester.

Such organic molecules quickly surround the non-magnetic metal material during the vapor deposition, and therefore there can be produced a metal nanoparticle colloid which is advantageous not only in that the colloid has non-magnetic metal nanoparticles formed from a non-magnetic metal, but also in that the colloid has metal nanoparticles having various shapes.

In the method for producing a metal nanoparticle colloid according to the embodiment of the invention, the concentration of the organic molecules 2 in the base liquid 40 is 3 to 20% by volume, and therefore the number of the organic molecules surrounding the non-magnetic metal material during the vapor deposition can be appropriate, and thus there can be produced a metal nanoparticle colloid which is advantageous not only in that the colloid has non-magnetic metal nanoparticles formed from a non-magnetic metal, but also in that the colloid has metal nanoparticles having various shapes.

In the method for producing a metal nanoparticle colloid according to the embodiment of the invention, the base running speed in the vacuum drum 30 is 10 to 500 mm/s, and therefore the speed of the organic molecules surrounding the non-magnetic metal material during the vapor deposition can be appropriate, and thus there can be produced a metal nanoparticle colloid which is advantageous not only in that the colloid has non-magnetic metal nanoparticles formed from a non-magnetic metal, but also in that the colloid has metal nanoparticles having various shapes.

The metal nanoparticle colloid according to the embodiment of the invention is a metal nanoparticle colloid produced by the above-mentioned method for producing a metal nanoparticle colloid, wherein the metal nanoparticle colloid has a nonpolar hydrocarbon oil 3 having a vapor pressure of $10^{-3}$ Torr or less at room temperature, metal nanoparticles 1 being dispersed in the nonpolar hydrocarbon oil 3, comprising a non-magnetic metal, and having a substantially spherical shape, a substantially plate shape, a substantially column shape, or a substantially fibrous shape, and organic molecules 2 joined to the metal nanoparticles 1 through an atom of an N atom, an S atom, a P atom, an O atom in an ester linkage, an O atom in an ether linkage, or an O atom in an epoxy linkage, or a functional group of an $NH_2$ group, an NH group, an SH group, a PO group, or an OH group, and therefore the metal nanoparticle colloid is advantageous not only in that it has non-magnetic metal nanoparticles formed from a non-magnetic metal, but also in that the colloid has metal nanoparticles having a substantially spherical shape (shape of substantially sphere), a substantially plate shape (flattened flake shape), a substantially column shape (rod-like shape), a substantially fibrous shape, a shape of non-sphere (indefinite shape), a shape of sphere, a shape of polygonal octahedron, or a shape of hexagonal prism.

The method for producing a metal nanoparticle colloid and the metal nanoparticle colloid according to an embodiment of the present invention are not limited to the above-mentioned embodiment and can be changed or modified within the range of the technical concept of the invention. Specific examples of the embodiments are shown in the following Examples, but the following Examples should not be construed as limiting the scope of the invention.

EXAMPLES

Example 1

Preparation of a Metal Nanoparticle Colloid

A base liquid was first prepared using an alkylnaphthalene as a nonpolar hydrocarbon oil and oleylamine (aliphatic amine) as organic molecules at an organic molecule concentration of 18.9% by volume. Then, the prepared base liquid was placed in an active liquid surface continuous vacuum deposition apparatus, and Cu was used as a metal material and the metal material was placed in a crucible. Then, the inside of the vacuum drum was evacuated to $10^{-5}$ Torr. The vacuum drum was then rotated so that the base running speed became 127 mm/s. Then, while cooling the vacuum drum with cooling water, a heater arranged around the crucible was heated to heat the metal material. The heating temperature was rendered constant, and the metal material was deposited on the base liquid to produce a metal nanoparticle colloid. Then, the metal nanoparticle colloid (metal nanoparticle colloid in Example 1) was removed from the vacuum drum.

<Evaluation of the Metal Nanoparticle Colloid>

With respect to the metal nanoparticle colloid in Example 1, a TEM evaluation was conducted. The obtained metal nanoparticle colloid had metal nanoparticles having a substantially spherical shape. The diameter was 10 to 15 nm.

Examples 2 to 6

Metal nanoparticle colloids in Examples 2 to 6 were individually formed in substantially the same manner as in Example 1 except that sorbitan trioleate (sorbitan fatty acid ester), tetraglycerol pentaoleate (polyglycerol fatty acid ester), stearyl mercaptan (mercaptan), polybutenylsuccinic acid tetraethylenepentamine imide (abbreviated to "PBSCTEPAI") (succinic acid polyethyleneamine), or trioleyl phosphate (phosphate) was used as organic molecules, that the organic molecule concentration was changed to 3.4 to 10% by volume, and that the base running speed was changed to 100 to 150 mm/s.

Examples 7 to 11

Metal nanoparticle colloids in Examples 7 to 11 were individually formed in substantially the same manner as in Example 1 except that Ag was used as a non-magnetic metal material, that oleylamine (aliphatic amine), sorbitan trioleate (sorbitan fatty acid ester), polybutenylsuccinimide (abbreviated to "PBSCI") (succinic acid derivative), stearyl mercaptan (mercaptan), or trioctylphosphine oxide (abbreviated to "TOPO") (aliphatic phosphoric oxide) was used, that the organic molecule concentration was changed to 3.5 to 14% by volume, and that the base running speed was changed to 16 to 150 mm/s.

Examples 12 to 16

Metal nanoparticle colloids in Examples 12 to 16 were individually formed in substantially the same manner as in Example 1 except that Au was used as a non-magnetic metal material, that oleylamine (aliphatic amine), stearylamine oleate (alkylamine fatty acid salt), polybutenylsuccinic acid tetraethylenepentamine imide (succinic acid polyethyleneamine), sorbitan trioleate (sorbitan fatty acid ester), or TOLP (phosphate) was used, that the organic molecule concentration was changed to 7.2 to 7.6% by volume, and that the base running speed was changed to 100 mm/s.

Examples 17 to 20

Metal nanoparticle colloids in Examples 12 to 16 were individually formed in substantially the same manner as in Example 1 except that Sn was used as a non-magnetic metal material, that sorbitan trioleate (sorbitan fatty acid ester), oleylamine (aliphatic amine), TOPO (aliphatic phosphoric oxide), or propylene oxide oleyl ether (polypropylene oxide fatty acid ether) was used, that the organic molecule concentration was changed to 7.8 to 15% by volume, and that the base running speed was changed to 101 to 127 mm/s.

The conditions and results of Examples 1 to 20 were summarized in Table 1.

TABLE 1

| | Non-transition metal material | Organic molecules | Organic molecule concentration (vol %) | Base running speed (mm/s) | Shape of metal nanoparticles | Particle diameter (nm) |
|---|---|---|---|---|---|---|
| Example 1 | Cu | Oleylamine | 18.9 | 127 | Sphere | 10-15 |
| Example 2 | Cu | Sorbitan trioleate | 3.4 | 100 | Indefinite shape | 4-8 |
| Example 3 | Cu | Tetraglycerol pentaoleate | 7.8 | 127 | Plate shape | 10-20 |
| Example 4 | Cu | Stearyl mercaptan | 7.9 | 127 | Spherical shape | 2-3 |
| Example 5 | Cu | PBSCTEPAI (*1) | 10 | 150 | Fibrous shape | Width: 5, Length: 10 |
| Example 6 | Cu | Trioleyl phosphate | 7.7 | 127 | Rod-like shape | 5-20 |
| Example 7 | Ag | Oleylamine | 14 | 150 | Sphere | 7 |
| Example 8 | Ag | Sorbitan trioleate | 7.9 | 150 | Indefinite shape | 2-20 |
| Example 9 | Ag | PBSCI (*2) | 5.3 | 19 | Indefinite shape | 2-20 |
| Example 10 | Ag | Stearyl mercaptan | 3.5 | 16 | Fibrous shape | 2-20 |
| Example 11 | Ag | TOPO (*3) | 5 | 58 | Ellipsoid | 10-50 |
| Example 12 | Au | Oleylamine | 7.6 | 100 | Sphere | 2-3 |
| Example 13 | Au | Stearylamine oleate | 7.5 | 100 | Sphere | 5-10 |
| Example 14 | Au | PBSCTEPAI (*1) | 7.5 | 100 | Fibrous shape | 5-10 |
| Example 15 | Au | Sorbitan trioleate | 7.2 | 100 | Thin plate shape | 7-10 |
| Example 16 | Au | TOLP (Phosphate) | 7.4 | 100 | Sphere | 5-7 |
| Example 17 | Sn | Sorbitan trioleate | 7.8 | 101 | Sphere | 10-15 |
| Example 18 | Sn | Oleylamine | 15 | 127 | Plate shape | 50-100 |
| Example 19 | Sn | TOPO (*3) | 11.2 | 127 | Indefinite shape | 50-100 |
| Example 20 | Sn | Propylene oxide oleyl ether | 8 | 127 | Plate shape | 50-200 |

(*1): Polybutenylsuccinic acid tetraethylenepentamine imide
(*2): Polybutenyl succinimide
(*3): Trioctylphosphine oxide (Aliphatic phosphoric oxide)

Next, with respect to the combinations of various metals and organic molecules as surfactants suitable for them and the shapes and nanoparticle sizes of the metal nanoparticles which can be produced, various combinations and conditions were successively attempted and numerous experiments were conducted.

As a result of the experiments and studies, specific surfactants particularly suitable for the respective metals in the production of a metal nanoparticle colloid have been found. All the surfactants have a hydrophile-lipophile balance value (HLB value) in the range of 9 or less. It has been clearly found that when using a specific surfactant particularly suitable for each metal in the production of a metal nanoparticle colloid, a stable colloid dispersion system is formed, and, according to the type of the surfactant, there is obtained a metal nanoparticle colloid having particles which contain no foreign matter, and almost all of which have the same shape of particle and the same particle size.

The nonpolar hydrocarbon oil to be used may be an alkylnaphthalene, a paraffin, or a naphthene.

Further, it has been clearly found that when the concentration (% by volume) of the surfactant in the base liquid is in the range of from several to less than twenty %, the production can be conducted without any problem. It has been clearly found that when the base running speed (mm/s) is in the wide range of about 20 to 150, the production can be conducted without any problem.

The findings obtained by the experiments and studies are shown in the following Examples for the respective metals.

Example 21

Preparation of a Metal Nanoparticle Colloid

Ag is used as a metal material. A base liquid was first prepared using an alkylnaphthalene as a nonpolar hydrocarbon oil and a sorbitan fatty acid ester (HLB value: 3 or less) as organic molecules as a surfactant at a base liquid concentration of 20% by volume. Then, the prepared base liquid was placed in an active liquid surface continuous vacuum deposition apparatus, and a metal material was placed in a crucible. Then, the inside of the vacuum drum was evacuated to $10^{-5}$ Torr. The vacuum drum was then rotated so that the base running speed became 120 mm/s. Then, while cooling the vacuum drum with cooling water, a heater arranged around the crucible was heated to heat the metal material. The heating temperature was rendered constant, and the metal material was deposited on the base liquid to produce a metal nanoparticle colloid. Then, the metal nanoparticle colloid (metal nanoparticle colloid in Example 21) was removed from the vacuum drum.

<Evaluation of the Metal Nanoparticle Colloid>

With respect to the metal nanoparticle colloid in Example 21, a TEM evaluation was conducted. The obtained metal nanoparticle colloid had particles almost all of which had a substantially true spherical shape and contained no foreign matter. Almost all the particles had a particle size in the range of from 3 to 5 nm.

Example 22

Ag is used as a metal material. A metal nanoparticle colloid was prepared and evaluated under substantially the same conditions as in Example 21 except that a sorbitan fatty acid ester (HLB value: more than 3 to 4.5) was used as organic molecules as a surfactant. The obtained metal nanoparticle colloid had particles almost all of which had a substantially true spherical shape and contained no foreign matter. Almost all the particles had a particle size in the range of from 5 to 10 nm.

Example 23

Ag is used as a metal material. A metal nanoparticle colloid was prepared and evaluated under substantially the same conditions as in Example 21 except that an alkyl phosphoric oxide (HLB value: less than 9) was used as organic molecules as a surfactant. All the metal nanoparticles had a shape of non-sphere (indefinite shape), and almost all the particles had a particle size in the range of from 10 to 15 nm.

Examples 24 to 38

Metal nanoparticle colloids were individually prepared under substantially the same conditions as in Example 21 except that the combination of the metal and the suitable surfactant used was changed, and evaluation was made with respect to the obtained metal nanoparticle colloids. The results of the evaluation are shown in Table 2.

TABLE 2

| | Metal element | Suitable surfactant | Shape of metal nanoparticles | Size of metal particles |
|---|---|---|---|---|
| Example 21 | Silver (Ag) | Sorbitan fatty acid ester, HLB value: 3 or less | Sphere | 3-5 nm |
| Example 22 | Silver (Ag) | Sorbitan fatty acid ester, HLB value: 4.5 or less | Sphere | 5-10 nm |
| Example 23 | Silver (Ag) | Alkyl phosphoric oxide | Non-sphere | 10-15 nm |
| Example 24 | Silver (Ag) | Thiol (or mercaptan) | Rod-like shape | Short diameter: 10-15 nm Aspect ratio: 3-5 |
| Example 25 | Gold (Au) | Aliphatic primary amine | Polygonal octahedron | 5-10 nm |
| Example 26 | Bismuth (Bi) | Polybutenylsuccinic acid polyamine imide | Sphere | 10-15 nm |
| Example 27 | Chromium (Cr) | Polybutenylsuccinic acid ester | Sphere | 2 nm |
| Example 28 | Chromium (Cr) | Polybutenylsuccinic acid polyamine imide | Non-sphere | 10 nm |
| Example 29 | Copper (Cu) | Thiol (or mercaptan) | Sphere | 2-3 nm |
| Example 30 | Copper (Cu) | Aliphatic primary amine | Sphere | 5-7 nm |
| Example 31 | Copper (Cu) | Polyglycerol fatty acid ester | Flattened flake shape | 10-15 nm |
| Example 32 | Copper (Cu) | Polybutenylsuccinic acid polyamine imide | Fibrous shape | Width: 10 nm, Aspect ratio: 3-30 |
| Example 33 | Dysprosium (Dy) | Alkyl phosphoric oxide | Substantially sphere | 10 nm |
| Example 34 | Indium (In) | Polybutenylsuccinic acid polyamine imide | Sphere | 10-20 nm |
| Example 35 | Manganese (Mn) | Alkyl phosphoric oxide | Substantially sphere | 3 nm |
| Example 36 | Neodymium (Nd) | Alkyl phosphoric oxide | Substantially sphere | 10 nm |

TABLE 2-continued

|  | Metal element | Suitable surfactant | Shape of metal nanoparticles | Size of metal particles |
|---|---|---|---|---|
| Example 37 | Palladium (Pd) | Polybutenylsuccinic acid polyamine imide | Sphere | 2 nm |
| Example 38 | Zinc (Zn) | Polybutenylsuccinic acid ester | Hexagonal prism | 10-500 nm |

INDUSTRIAL APPLICABILITY

The method for producing a metal nanoparticle colloid and the metal nanoparticle colloid of the present invention are advantageous in that there can be produced a metal nanoparticle colloid having metal nanoparticles which are non-magnetic and controlled in the size, and which have a substantially spherical shape (shape of substantially sphere), a substantially plate shape (flattened flake shape), a substantially column shape (rod-like shape), a substantially fibrous shape, a shape of non-sphere (indefinite shape), a shape of sphere, a shape of polygonal octahedron, or a shape of hexagonal prism, and therefore the method and the metal nanoparticle colloid of the invention are applicable to the electric device industry, synthetic chemistry industry, and the like using a metal nanoparticle colloid.

Specifically, non-magnetic metal particles having a nanometer size exhibit different absorption colors and different reflection colors depending on the shape of the particles, and therefore are utilized as a pigment having a controlled color tone. Particularly, the non-magnetic metal particles utilized as a black pigment are widely used as a light screen filter in liquid crystal panel display devices and plasma panel display and organic electroluminescence display devices.

A colloid having dispersed nanoparticles of silver or copper having high electrical conductivity is used as a conductive ink having more excellent electrical conductivity than the ink using a colloid having dispersed spherical particles, and is used in the production of a printed circuit board by a printing method and the formation of an electrode for stacked capacitor, chip type resistor, and the like. When utilized in the production of an anisotropic conductive sheet, the above colloid exhibits stronger anisotropy than that obtained when using a colloid having dispersed spherical particles.

Further, metal or alloy fine particles which are produced by subjecting the non-magnetic metal nanoparticle colloid as a raw material to appropriate treatment and which have the colloid supported on diatomaceous earth, activated carbon, alumina, or the like, are utilized as a variety of catalysts, specifically, a catalyst for a dehydrogenation reaction in the production of hydrogen ($H_2$) from methane ($CH_4$) or another hydrocarbon by a steam reforming method and the decomposition reaction of ammonia ($NH_3$); a catalyst for a hydrogenation reaction in the conversion of an unsaturated fatty acid to a saturated fatty acid, the production of a hardened oil for margarine or soap from an unsaturated liquid food oil, and the conversion of an olefin to a paraffin; a catalyst for synthetic fuel production in the conversion of a heavy oil to gasoline by cracking and the production of high-octane gasoline from petroleum naphtha; and a catalyst for air pollution prevention against exhaust gas from engine.

Furthermore, alloy fine particles having Pd supported on a conductive substance, such as activated carbon, are utilized as anode and cathode active materials for a fuel cell which converts chemical energy to electric energy. The catalytic activity of catalyst particles depends heavily on the size of the particles as well as the shape of the particles, and therefore catalyst fine particles having various aspect ratios and shapes give versatility and diversity to the catalytic performance.

DESCRIPTION OF REFERENCE NUMERALS

1: Metal nanoparticles
2: Organic molecules
3: Nonpolar hydrocarbon oil
10: Metal nanoparticle colloid
21; 23: Container
30: Vacuum drum
31: Direction of flow of cooling water
32: Masking shield
33: Support
34: Heater wiring
35: Crucible
36: Metal material
37: Direction of evaporation
40: Base liquid
42: Direction of rotation
S1: Base liquid preparation step
S2: Active liquid surface continuous vacuum deposition step

The invention claimed is:
1. A method for producing a metal nanoparticle colloid having metal nanoparticles dispersed in a nonpolar hydrocarbon oil, the metal nanoparticles being coated with organic molecules, wherein all of the metal nanoparticles have a specific shape of particle and a particle size in a specific range and contain almost no foreign matter of metal particles in a shape other than the specific shape of particle,
the method comprising the following steps (a) to (d):
(a) selecting a specific type of non-magnetic metal material from Cu, Ag, Au, Sn, Bi, Cr, Dy, In, Mn, Nd, Pd, and Zn;
(b) selecting, according to the selected specific type of non-magnetic metal material, a specific type of organic molecules having an HLB value in a specific range and having both a hydrophilic group and a lipophilic group, which is a surfactant having an HLB value of less than 9, from an aliphatic amine, a sorbitan fatty acid ester, a polyglycerol fatty acid ester, a mercaptan, a phosphate, an aliphatic phosphoric oxide, an alkylamine fatty acid salt, a polypropylene oxide fatty acid ether, a thiol, a succinic acid polyethyleneamine polypropylene oxide fatty acid ether, a polybutenylsuccinic acid polyamine imide, and polybutenylsuccinic acid ester;
(c) mixing the selected specific type of organic molecules into a nonpolar hydrocarbon oil having a vapor pressure of $10^{-3}$ Torr or less at room temperature, which is an alkylnaphthalene, a paraffin, or a naphthene, at a concentration of 3 to 20% by volume to prepare a base liquid; and
(d) placing the base liquid in a rotatable vacuum drum and charging the specific type of non-magnetic metal material in a crucible provided in the vacuum drum, and depositing the vapor of the non-magnetic metal material on the base liquid which adheres to the inner wall of the vacuum drum and rotates together with the rotating drum under conditions such that the inside of the vacuum drum is under a reduced pressure and the vacuum drum is rotated so that the running speed of the base liquid becomes 10 to 500 mm/s.

2. The method for producing a metal nanoparticle colloid according to claim 1, wherein the non-magnetic metal material is Ag, the organic molecules used as a surfactant are a sorbitan fatty acid ester having an HLB value of 3 or less, and the obtained metal nanoparticle colloid has particles almost all of which have a substantially true spherical shape and contain no foreign matter, and have a particle size in the range of from 3 to 5 nm.

3. The method for producing a metal nanoparticle colloid according to claim 1, wherein the non-magnetic metal material is Ag, the organic molecules used as a surfactant are a sorbitan fatty acid ester having an HLB value of more than 3 to less than 9, and the obtained metal nanoparticle colloid has particles almost all of which have a substantially true spherical shape and contain no foreign matter, and have a particle size in the range of from 5 to 10 nm.

4. The method for producing a metal nanoparticle colloid according to claim 1, wherein the non-magnetic metal material is Ag, the organic molecules used as a surfactant are a thiol having an HLB value of less than 9, and the obtained metal nanoparticle colloid has particles almost all of which have a rod-like shape and contain no foreign matter, and have a particle size such that the short diameter is in the range of from 10 to 15 nm and the aspect ratio is in the range of from 3 to 5.

5. The method for producing a metal nanoparticle colloid according to claim 1, wherein the non-magnetic metal material is Au, the organic molecules used as a surfactant are an aliphatic primary amine having an HLB value of less than 9, and the obtained metal nanoparticle colloid has particles almost all of which have a shape of polygonal octahedron and contain no foreign matter, and have a particle size in the range of from 5 to 10 nm.

6. The method for producing a metal nanoparticle colloid according to claim 1, wherein the non-magnetic metal material is Bi, the organic molecules used as a surfactant are a polybutenylsuccinic acid polyamine imide having an HLB value of less than 9, and the obtained metal nanoparticle colloid has particles almost all of which have a substantially true spherical shape and contain no foreign matter, and have a particle size in the range of from 10 to 15 nm.

7. The method for producing a metal nanoparticle colloid according to claim 1, wherein the non-magnetic metal material is Cr, the organic molecules used as a surfactant are a polybutenylsuccinic acid ester having an HLB value of less than 9, and the obtained metal nanoparticle colloid has particles almost all of which have a substantially true spherical shape and contain no foreign matter, and have a particle size of approximately 2 nm.

8. The method for producing a metal nanoparticle colloid according to claim 1, wherein the non-magnetic metal material is Cu, the organic molecules used as a surfactant are a thiol having an HLB value of less than 9, and the obtained metal nanoparticle colloid has particles almost all of which have a true spherical shape and contain no foreign matter, and have a particle size in the range of from 2 to 3 nm.

9. The method for producing a metal nanoparticle colloid according to claim 1, wherein the non-magnetic metal material is Cu, the organic molecules used as a surfactant are an aliphatic primary amine having an HLB value of less than 9, and the obtained metal nanoparticle colloid has particles almost all of which have a true spherical shape and contain no foreign matter, and have a particle size in the range of from 5 to 7 nm.

10. The method for producing a metal nanoparticle colloid according to claim 1, wherein the non-magnetic metal material is Cu, the organic molecules used as a surfactant are a polyglycerol fatty acid ester having an HLB value of less than 9, and the obtained metal nanoparticle colloid has particles almost all of which have a flattened flake shape and contain no foreign matter, and have a particle size in the range of from 10 to 15 nm.

11. The method for producing a metal nanoparticle colloid according to claim 1, wherein the non-magnetic metal material is Cu, the organic molecules used as a surfactant are a polybutenylsuccinic acid polyamine imide having an HLB value of less than 9, and the obtained metal nanoparticle colloid has particles almost all of which have a fibrous shape and contain no foreign matter, and have a particle size such that the width (diameter) is approximately 10 nm and the aspect ratio is in the range of from 3 to 30.

12. The method for producing a metal nanoparticle colloid according to claim 1, wherein the non-magnetic metal material is Dy (dysprosium), the organic molecules used as a surfactant are an alkyl phosphoric oxide having an HLB value of less than 9, and the obtained metal nanoparticle colloid has particles almost all of which have a substantially spherical shape and contain no foreign matter, and have a particle size of approximately 10 nm.

13. The method for producing a metal nanoparticle colloid according to claim 1, wherein the non-magnetic metal material is In, the organic molecules used as a surfactant are a polybutenylsuccinic acid polyamine imide having an HLB value of less than 9, and the obtained metal nanoparticle colloid has particles almost all of which have a true spherical shape and contain no foreign matter, and have a particle size in the range of from 10 to 20 nm.

14. The method for producing a metal nanoparticle colloid according to claim 1, wherein the non-magnetic metal material is Mn, the organic molecules used as a surfactant are an alkyl phosphoric oxide having an HLB value of less than 9, and the obtained metal nanoparticle colloid has particles almost all of which have a substantially spherical shape and contain no foreign matter, and have a particle size of approximately 3 nm.

15. The method for producing a metal nanoparticle colloid according to claim 1, wherein the non-magnetic metal material is Nd, the organic molecules used as a surfactant are an alkyl phosphoric oxide having an HLB value of less than 9, and the obtained metal nanoparticle colloid has particles almost all of which have a substantially spherical shape and contain no foreign matter, and have a particle size of approximately 10 nm.

16. The method for producing a metal nanoparticle colloid according to claim 1, wherein the non-magnetic metal material is Pd, the organic molecules used as a surfactant are a polybutenylsuccinic acid polyamine imide having an HLB value of less than 9, and the obtained metal nanoparticle colloid has particles almost all of which have a true spherical shape and contain no foreign matter, and have a particle size of approximately 2 nm.

17. The method for producing a metal nanoparticle colloid according to claim 1, wherein the non-magnetic metal material is Zn, the organic molecules used as a surfactant are a polybutenylsuccinic acid ester having an HLB value of less than 9, and the obtained metal nanoparticle colloid has particles almost all of which have a shape of hexagonal prism and contain no foreign matter, and have a particle size in the range of from 10 to 500 nm.

* * * * *